United States Patent [19]

Burgdorf et al.

[11] E Patent Number: Re. 31,794

[45] Reissued Date of Patent: Jan. 8, 1985

[54] SPOT-TYPE DISC BRAKE

[75] Inventors: Jochen Burgdorf, Offenbach; Karl-Heinz Klose, Frankfurt; Karl Storzel, Sprendlingen, all of Fed. Rep. of Germany

[73] Assignee: ITT Industries, Inc., New York, N.Y.

[21] Appl. No.: 471,067

[22] Filed: Mar. 7, 1983

Related U.S. Patent Documents

Reissue of:

[64] Patent No.: 3,913,709
Issued: Oct. 21, 1975
Appl. No.: 479,934
Filed: Jun. 17, 1974

U.S. Applications:

[63] Continuation of Ser. No. 209,233, Nov. 19, 1980, abandoned, which is a continuation of Ser. No. 21,053, Mar. 16, 1979, abandoned, which is a continuation of Ser. No. 842,008, Oct. 13, 1977, abandoned.

[30] Foreign Application Priority Data

Aug. 9, 1973 [DE] Fed. Rep. of Germany ..... 2340316

[51] Int. Cl.[3] ..... F16D 55/224

[52] U.S. Cl. ..... 188/73.35; 188/72.4; 188/73.47

[58] Field of Search ..... 188/71.1, 72.4, 72.5, 188/73.35, 73.43, 73.46, 73.47, 73.38

[56] References Cited

U.S. PATENT DOCUMENTS

| | | | |
|---|---|---|---|
| 3,158,230 | 11/1964 | Choungs | 188/73.43 |
| 3,421,602 | 1/1969 | Craske | 188/73.47 |
| 3,590,961 | 7/1971 | Airheart | 188/73.47 |
| 3,628,636 | 12/1971 | Beller et al. | 188/73.43 |
| 3,719,257 | 3/1973 | Maurice | 188/72.5 |
| 3,933,226 | 1/1976 | Maurice | 188/72.5 |

FOREIGN PATENT DOCUMENTS

| | | | |
|---|---|---|---|
| 2163586 | 7/1972 | Fed. Rep. of Germany | 188/73.47 |
| 2410712 | 9/1974 | Fed. Rep. of Germany | 188/73.47 |
| 11016 | 3/1968 | Japan | 188/73.47 |
| 36524 | 10/1971 | Japan | 188/73.47 |
| 1333599 | 10/1973 | United Kingdom | 188/73.43 |

*Primary Examiner*—George E. A. Halvosa
*Attorney, Agent, or Firm*—James B. Raden; Marvin M. Chaban

[57] ABSTRACT

There is disclosed a spot-type disc brake having a non-rotating brake carrier to receive the brake torque with brake shoes disposed on both sides of the brake disc. A yoke or frame embraces the disc and is movably guided in the brake carrier and held without clearance by resilient means. The frame transmits the operating force of an actuating device to the brake shoe disposed on the side of the disc remote from the actuating device. The frame is rigidly supported at and movable with respect to three guide points on the brake carrier. A biased spring is disposed between the brake carrier and frame. The spring [tensions] *forces* the frame [at] *against* its guide points and *the spring force* acts on the frame at a point distant from the three guide points.

9 Claims, 5 Drawing Figures

SPOT-TYPE DISC BRAKE

Matter enclosed in heavy brackets [ ] appears in the original patent but forms no part of this reissue specification; matter printed in italics indicates the additions made by reissue.

*CROSS-REFERENCE TO RELATED APPLICATIONS*

*This is a continuation of application Serial No. 209,233, filed November 19, 1980, now abandoned, which is a continuation of application Serial No. 021,053, filed March 16, 1979, now abandoned, which is a continuation of application Serial No. 842,008, filed October 13, 1977, now abandoned, which is a reissue application of Serial No. 479,934, filed June 17, 1974, now Patent No. 3,913,709.*

BACKGROUND OF THE INVENTION

This invention relates to a spot-type disc brake, particularly for motor vehicles, with a non-rotating brake carrier to receive the brake torque, said brake carrier being immovable in relation to the brake disc. Brake shoes are arranged on both sides of a brake disc, with a yoke or frame protruding over the brake disc and movably guided in the brake carrier in the direction of the brake disc and being held without clearance by resilient means. The yoke or frame transmits the operating force of an actuating device arranged on one side of the brake disc and acting directly upon one brake shoe, to the brake shoe arranged on the opposite side of the brake disc.

In such spot-type disc brakes the guides of the frame or yoke in the brake carrier are designed with clearance in order to guarantee an easy movability of the movable members in all operational conditions, and in order to avoid high costs arising from special manufacturing tolerances. To avoid rattling noises by vibrations produced when the vehicle is in motion, it is common to [tension] *force* the frame or the yoke [relative to] *against* the brake carrier by resilient means and, thus, overcome the manufacturing tolerances.

From the German published Patent application DT-OS No. 1,905,576 a spot-type disc brake is known wherein the frame at which the actuating device is also arranged is movably supported in the brake carrier in the direction of the brake disc. This is to say that this frame is guided in rectangular grooves which are disposed in the brake carrier on one side of the brake disc, the frame being [tensioned relative to] *forced against* the lower groove wall by spring arms, which are supported at the upper groove wall. The frame is supported at the opposite side of the brake disc by a pin formed in the frame with the pin being disposed in a recess in the backing plate of the brake shoe which is connected to the brake carrier via locking pins. Due to the arrangement of the actuating device and the frame, the center of gravity of the frame is far outside the triangle formed by the connecting lines of the guide points, and, therefore, high forces due to gravity occur with vibrations when the vehicle is in motion which because of the unfavorable leverages necessitate—in order to be supported by the spring arms—that these spring arms be provided with a high spring tension. The unfavorable leverages result from the fact that the distance between the center of gravity of the frame and the center of revolution, which is defined by the pin in the recess of the brake shoe on the opposite side of the brake disc, is considerably longer than the distance between the point of application of force of the spring arms and the center of revolution. The high spring forces, however, produce high surface pressures between the frame and the lower groove wall, and owing to the friction this phenomenon leads to high shifting forces when the brake is actuated, and impedes a reset of the brake shoes—connected with the frame—to the necessary brake lifting clearance after a braking process.

SUMMARY OF THE INVENTION

It is the object of this invention to provide a spot-type disc brake of the above mentioned type having the yoke or frame supported at the brake carrier without clearance in all operational conditions, which needs low forces in order to shift the yoke or frame when the brake is actuated, and which is capable of simple construction and inexpensive manufacture.

A feature of the present invention is the provision of a spot-type disc brake comprising: a brake disc; a brake actuating means; a pair of brake shoes, one of the brake shoes being disposed on one side of the disc actuated by the actuating means and the other of the brake shoes being disposed on the other side of the disc; a non-rotating brake carrier carrying the brake shoes and receiving braking torque, the carrier being immovable relative to the disc, a frame embracing the disc and movably guided with respect to the carrier in a direction toward and away from the disc, the frame; transmitting the actuating force of the actuating means to the other of the brake shoes, at least three guide points to rigidly support and movably guide the frame, at least two of the guide points being rigidly connected to the carrier, and a biased spring disposed between the carrier and the frame to hold the frame without clearance against the guide points, the spring acting on the frame at a point spaced from the guide points.

Another feature of this invention is that the spring acts upon the yoke or frame at a point outside the triangle formed by the connecting lines of the guide points. Thus, a statically determined guide of the yoke or frame is created at the brake carrier, and the support forces act upon both sides of the yoke or frame, and, thus, the yoke or frame is connected with the brake carrier without clearance, even with rough manufacturing tolerances.

Another feature of the inventive spot-type disc brake is that the point of application of force of the spring is arranged more distantly from the guide points than the center of gravity of the yoke or frame. Owing to the favorable leverages occurring in this arrangement, only a low prestress in the spring is needed.

Still another feature of this invention is to define the two guide points, at which the yoke or frame is supported, by two bolts which are immovably arranged in the brake carrier so that an interchangeable guide is provided which is immune to corrosion. It is favorable to arrange the bolts on an axis parallel to the brake disc.

A further feature of this invention is that the actuating device is fastened to a movable frame and two guide points are defined by surface pairs arranged in the direction of the disc periphery at a distance from one another on one side of the brake disc, and on the other side of the brake disc the third guide point is arranged which is defined by a recess in the backing plate of the adjacent brake shoe, the frame engaging the backing plate with a pin formed in the frame.

Still another feature of the present invention is that a spring is fastened to the brake carrier in order to [tension] *force* the frame [in] *against* its guides. The spring under pressure rests against the actuating device with a part of it projecting away from the brake carrier and which is guided underneath the frame and the actuating device. Owing to this arrangement the frame and the actuating device can be integrally formed because the spring does not extend through these two members, as was described with regard to the prior art spot-type disc brake. Moreover, this design enables the manufacture of a smaller brake model.

A further feature of this invention is that the above-mentioned spring is designed as a wire spring and that it is supported with two arms in holes in the brake carrier and that it acts on the actuating device with a loop projecting away from the brake carrier. If the contact surface for the spring at the yoke or frame forms an angle with the brake disc plane which is smaller or larger than 90°, a horizontal force of the spring will result therefrom which advantageously will cause a force which will produce an automatic reset to the necessary brake lifting clearance after a braking process.

Still a further feature of this invention is that a simple fastening of the above-mentioned spring to the brake carriers is achieved by designing the arms of the spring, which are disposed in holes in the brake carrier, with deflections at their ends, the arms being wedged in the holes with the deflection and the deflections prevent the spring from sliding out of the holes.

Still another feature of this invention is that the point of application of the above-mentioned spring is arranged between the guide points, defined by the surface pairs, and the center of gravity of the frame.

Another feature of the present invention is to dispose the guide plane formed by the surface pairs in the area of the center of gravity of the frame. Since in this arrangement the above-mentioned spring does not support the weight of the frame, it can be dimensioned with a low spring force and, thus, only infinitesimal shifting forces are needed in order to move the frame.

Still another feature of the present invention is that there will be favorable leverages in the spot-type disc brake, if the distances between the guide points, defined by the bolts, and the point of application of the above-mentioned spring and the third support point are approximately equal.

A further feature of the present invention is the provision of a spot-type disc brake which is mounted inside the wheel dish of a vehicle wheel. In this spot-type disc brake the guide points of the frame are arranged on both sides of the brake disc with the point of application of the spring on the side of the brake disc remote from the wheel dish disposed more distantly from the brake disc than the guide points on the same side of the brake disc, and with the spring force acting radially to the outside relative to the brake disc axis. Due to this arrangement, the spot-type disc brake can be arranged very close to the wheel dish contours, since the movable members, such as the frame or yoke, are rigidly supported in the direction of the wheel dish contours, so that a lifting of this member can only occur in the opposite direction.

The main advantages obtained with this invention are that owing to the inventive arrangement the guide points and the point of application of the spring support the yoke or frame is a way that—even when major vibrations occur—the yoke or frame is not lifted from these support points so that no rattling noises can develop, and moreover, a completely accurate, easily performable actuation of the brake is guaranteed.

A raise of the friction between the guide points defined by the bolts and the frame or yoke due to, e.g., corrosion which would be unfavorable for the easy performance of the brake actuation is advantageously avoided on account of the few contact surfaces. This also has an advantageous effect on the automatic reset which results from the spring abutting the actuating device with its slanted contact surface and the force component produced by this arrangement in the direction of the brake release.

When the distance between the center of gravity of the frame and the point of application of the spring is long, this long lever permits dimensioning the spring with a relative low spring force. Rattling noises which may occur with vibrations due to manufacturing tolerances of the brake shoe, on the side of the brake disc opposite to the actuating device, and of the holders of the brake shoe, are prevented because the frame with its pin engages a recess of this brake shoe and is [held under tension] *held by the spring force of* [by] the spring. Thus, the frame is supported at this brake shoe and overcomes the tolerances between the pin and the recess in the brake shoe and between the locking pins and [tensions] *holds* these locking pins relative to each other.

The simple inventive design of the spring which permits easy and simple manufacture is a further advantage. Moreover, the same spring can be used for brakes of different dimensions, since no other part of the brake obviates the optional arrangement of the spring at the brake carrier. This advantage permits production line manufacturing as well as simple and cheap storing. Moreover, the arrangement of the spring permits an exchange of the spring without dismounting the brake.

Advantageously, the inventive spot-type disc brake permits the brake body to be disposed very close to the inside rotation contour of the wheel dish. This arrangement allows a large and, therefore, favorable brake disc diameter. This arrangement of the brake is made possible by the fact that the movable members, such as the frame or yoke, are rigidly supported in the direction of the rotation contours of the wheel dish and owing to this a lifting of this member in the direction of this rotation contour is prevented.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
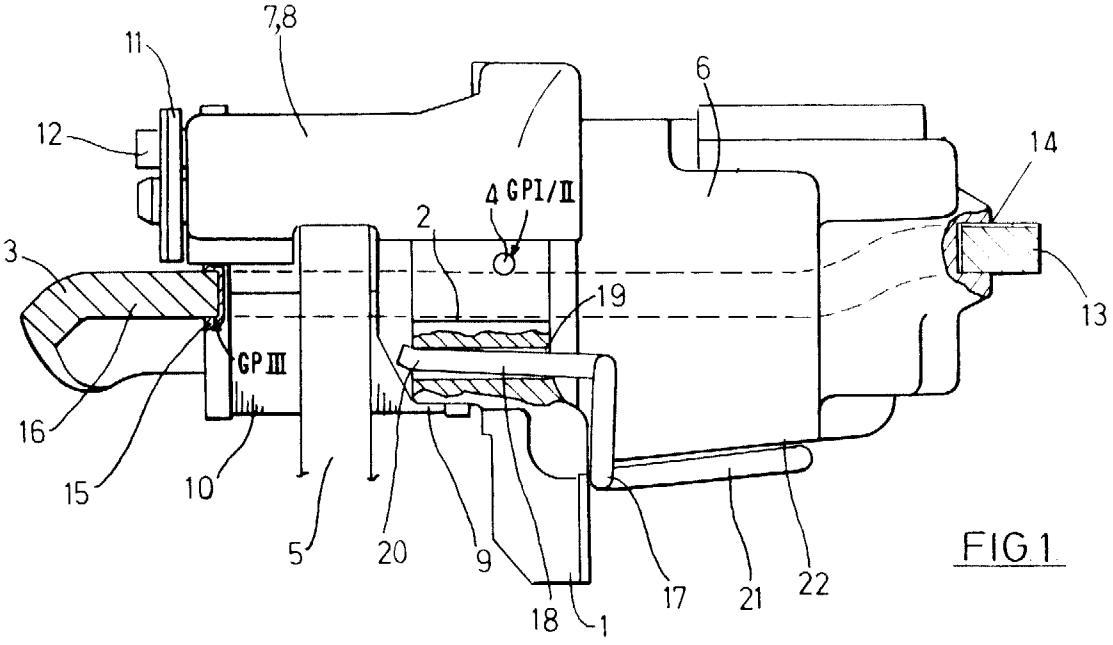
FIG. 1 is a side view of one embodiment of a spot-type disc brake in accordance with the principles of the present invention.
Figure 2:
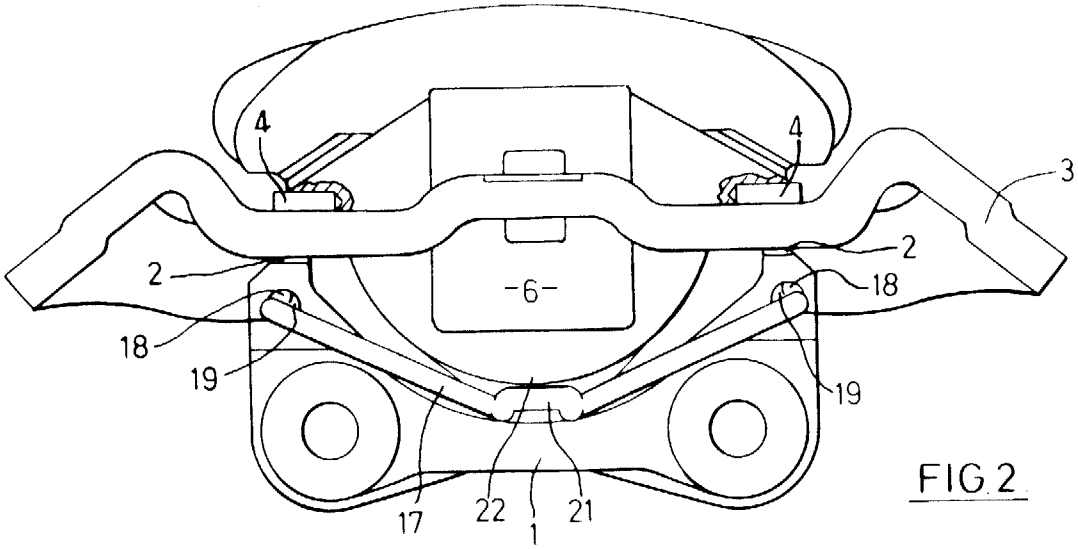
FIG. 2 is a rear view of FIG. 1.
Figure 3:
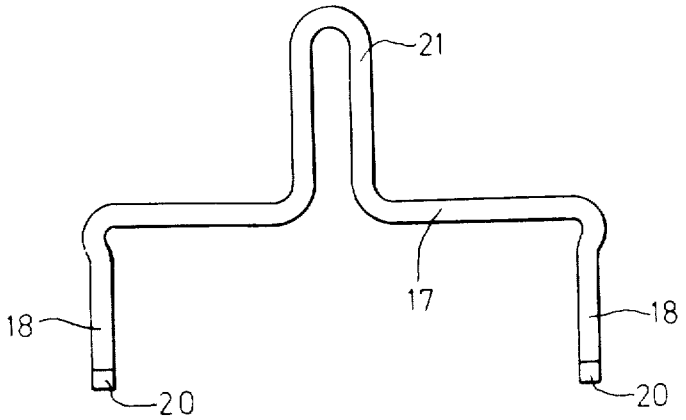
FIG. 3 is a top view of the spring.
Figure 4:
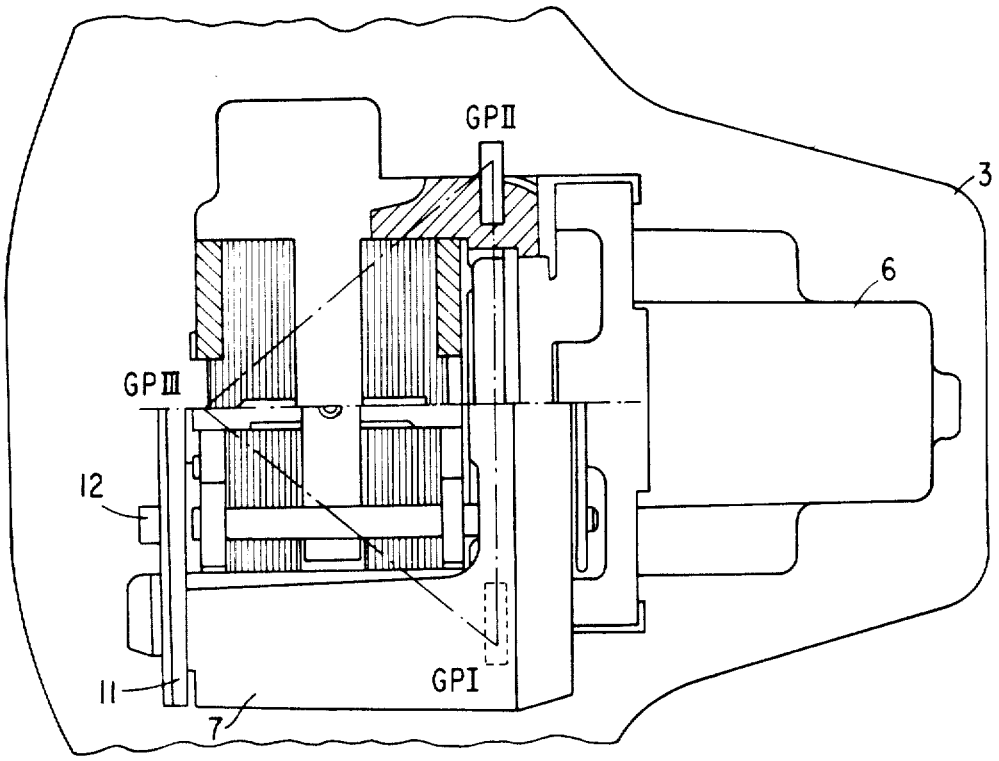
FIG. 4 is a partial top view, partially in cross-section, of FIG. 1.

Referring to FIGS. 1, 2, 3 and 4 the spot-type disc brake includes a brake carrier 1, which in the main consists of a plate, which on both of its sides has a groove 2 in the direction of the disc plane, in which the frame 3 is movably guided and is upwardly supported by the bolts 4. The actuating device 6 is disposed in the frame 3 spaced from and on one side of the brake disc 5. In the area of the periphery of disc 5 brake carrier 1 has arms 7 and 8 extending across the edge of disc 5. Between these arms the brake shoes 9 and 10 are located and supported in a peripheral direction. The ends of arms 7 and 8 are connected by a cross-piece 11. Brake shoes 9 and 10 are held in a radial direction by holding pins 12, which pass through holes in a plate of brake carrier 1 and in the cross-piece 11, and are engaged by slots in the backing plates of brake shoes 9 and 10. Frame 3 embracing actuating device 6 is designed with an attachment 13 at its rear end, which engages a recess 14 at the back of the housing of actuating device 6. On the side of brake disc 5 opposite to actuating device 6, frame 3 is held by a pin 16 projecting into a slot 15 in the backing plate of brake shoe 10.

In order to prevent rattling noises a spring 17 is arranged at brake carrier 1 which is to resiliently support and to [tension] *hold* frame 3 [relative to] *against* brake carrier 1. Spring 17 has two arms 18 projecting into holes 19 in the plate of brake carrier 1 and are jammed in the brake shoe backing plate by deflections 20 at the ends of arms 18. Spring 17 is bent at arms 18 projecting out of holes 19, and—supported at the brake shoe backing plate—is guided underneath the housing of actuating device 6, and is designed with a loop 21 projecting to the outside, the end of which rests against the bottom surface 22 of the housing of actuating device 6 under tension. This contact surface 22 is designed in a way that it has a slant which inclines from the region close to brake disc 5 to the region distant from brake disc 5. This results in a horizontal force component of spring 17 which assists in bringing about a reset to the necessary brake lifting clearance after a braking process. The vertical component of spring 17, acting on the housing of actuating device 6, which is rigidly connected with frame 3, tensions frame 3 in such a way that frame 3 is forced radially to the inside and is supported by slot 15 of brake shoe 10 by means of frame pin 16 and is forced radially to the outside against the guide points GPI and GPII defined by bolts 4. Owing to the fact that these guide points GPI and GPII are arranged as far as possible on the outer edge of frame 3, big and favorable levers are provided with the help of which—even with greater forces from the outside—only low spring forces are necessary in order to avoid a lifting of frame 3 from the guide points GPI and GPII (bolts 4) at the brake carrier. Slot 15 and pin 16 provide a third guide point GPIII.

If nevertheless, these forces from the outside overcome the spring force of spring 17, frame 3 will move away from the rotation contour of the wheel dish in the direction of the wheel axis, because the center of gravity of the frame with the members carried by the frame is between the point of application of force of spring 17 and the axis passing through bolts 4. This permits an arrangement of the brake close to this rotation contour of the wheel dish, and, thus, the brake can take advantage of a larger brake disc diameter.

Moreover, owing to the [tensioning] *forcing* of brake shoe 10 in the direction of the wheel axis, and as a result of the friction between brake shoe 10 and the support surface at arm 7 or 8, with the support surface absorbing the brake forces, brake shoe 10 is impeded from rotating round one of holding pins 12 so that a sudden bouncing of brake shoe 10 at one of its holders is avoided.

Figure 5:
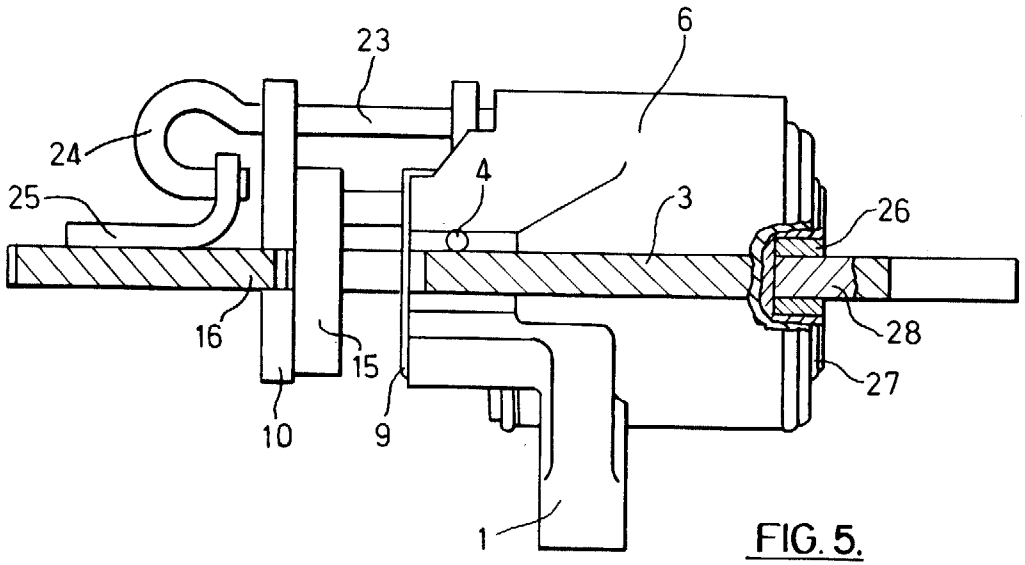
FIG. 5 is a side view of another embodiment of a spot-type disc brake in accordance with the principles of the present invention.

The embodiment illustrated in FIG. 5 shows a spot-type disc brake having a brake carrier 1 to which the actuating device 6 is fastened. Frame 3 is supported at one side by a pin 28 projecting into a slot 26 in the brake piston 27 on the back side of actuating device 6.

In the middle region of the brake, frame 3—such as in the preceding embodiment—is upwardly supported by two bolts 4 fastened to the brake carrier 1. The holding pins 23 which are to suspend the brake shoes 9 and 10 are designed with loops 24 at their ends and engage slots of a holder 25 disposed on frame 3. Holding pins 23 and loops 24 are made out of a resilient material and are mounted under prestress directed radially to the outside.

Owing to this resilient design of holding pins 23, the middle region of frame 3 is pressed against bolts 4, and the other end of frame 3 is supported with its pin 28 in slot 26.

Owing to the fact that holding pins 23 with their loops 24 [tension] *force* the frame 3 [relative to] *against* bolts 4 in the direction of the rotation contour of the wheel dish and that frame 3 is supported at the third immovable guide point with its pin 28 in slot 26 in brake piston 27, frame 3 cannot move further in the direction of the rotation contour of the wheel dish.

The only possibility—which, however, is unlikely on grounds of the leverages—that frame 3 can be lifted from its guide points is when the spring forces of the holding pins 23 are overcome. If such a lifting movement occurs, frame 3, however, will move away from the wheel dish. Thus, it is possible to arrange the brake very close to the rotation contour of the wheel dish and to take advantage of a favorable, largest possible brake disc diameter in this arrangement. With regard to this embodiment the support of brake shoe 10 has no influence on the direction of the prestress in the spring, since the brake forces are absorbed close to their line of application.

While we have described above the principles of our invention in connection with specific apparatus it is to be clearly understood that this description is made only by way of example and not as a limitation to the scope of our invention as set forth in the objects thereof and in the accompanying claims.

We claim:

1. A spot-type disc brake comprising:

a brake disc;

a brake actuating means;

a pair of brake shoes each having a backing plate and a brake pad, one of said brake shoes being disposed on one side of said disc actuated by said actuating means and the other of said brake shoes being disposed on the other side of said disc;

a non-rotating brake carrier carrying said brake shoes and receiving braking torque, said carrier being immovable relative to said disc;

a frame embracing said disc and movably guided with respect to said carrier in a direction toward and away from said disc, said frame transmitting the actuating force of said actuating means to said other of said brake shoes;

said brake actuating means including a housing rigidly connected to said frame and having a force receiving contact surface below said frame which is inclined upward toward said frame in a direction away from said disc;

at least three guide points to rigidly support and movably guide said frame, at least two of said guide points being rigidly connected to said carrier; and a biased spring having two arms each engaging a different one of two circular holes formed in and extending through said carrier parallel to, spaced from and below said frame and a loop interconnecting said two arms under tension resting against said contact surface to apply a horizontal and vertical component of force to a point on said contact surface to hold said frame without clearance against said guide points, said point on said contact surface being spaced from said guide points;

each of said arms including deflection on the ends thereof fastened in an associated one of said holes of said carrier and fastened in said backing plate of said one of said brake shoes.

2. A brake according to claim 1, wherein said point on said contact surface is disposed outside an imaginary triangle formed by imaginary lines interconnecting said guide points.

3. A brake according to claim 1, wherein said two of said guide points include two bolts immovably secured to said carrier.

4. A brake according to claim 3, wherein said two bolts are disposed on an axis parallel to said disc.

5. A brake according to claim 4, wherein the third of said guide points includes a recess in a backing plate of said other of said brake shoes, and a pin formed in said frame engaging said recess.

*6. In a spot-type disc brake having*

*a brake disc;*

*a brake actuating means;*

*a pair of brake shoes, one of said brake shoes being disposed on one side of said disc and actuated by said actuating means, and the other of said brake shoes being disposed on the other side of said disc;*

*a non-rotating brake carrier receiving braking torque, said carrier being immovable relative to said disc;*

*a frame or yoke element embracing said disc and movably guided with respect to said carrier in a direction toward and away from said disc, said element transmitting the actuating force of said actuating means to said other of said brake shoes; and*

*said brake actuating means including a housing and being in force transmitting contact with said element;*

*the improvement comprising only three guide points to rigidly support and movably guide said element, two of said guide points being rigidly connected to said carrier and disposed above said element to rigidly support and movably guide said element, said two of said three guide points exerting a downward force on said element and a third of said three guide points being disposed in one of said actuating means and a backing plate of said other of said brake shoes, said third of said three guide points exerting an upward force on said element; and*

*a single biasing spring having at least one end connected to said carrier at a point radially spaced from said two of said three guide points and said element and another portion thereof acting on one of said actuating means and said element to apply an upward component of force to hold said element without clearance against all of said three guide points;*

*said spring acting on said one of said actuating means and said element at a point spaced axially from all of said three guide points, said point being outside an imaginary triangle formed by imaginary lines interconnecting all of said three guide points;*

*said actuating means being secured to said element;*

*said third of said three guide points including*

*a recess in a backing plate of said other of said brake shoes, and*

*a pin formed in said element engaging said recess; and*

*said spring is fastened to said carrier and acts on said actuating means, said spring projecting away from said carrier and disposed under said element and said actuating means;*

*said spring being a wire spring having two arms fastened in holes of said carrier and a loop acting upwardly on said actuating means;*

*said actuating means including*

*a contact surface for said loop of said spring which is inclined upward toward said element in a direction away from said disc.*

*7. A brake according to claim 6, wherein*

*said two of said guide points include*

*two bolts immovably secured to said carrier.*

*8. A brake according to claim 7, wherein*

*said two bolts are disposed on an axis parallel to said disc.*

*9. A brake according to claim 1, wherein*

*each of said arms includes*

*deflections on the end thereof fastened in an associated one of said holes of said said carrier.*

* * * * *